UNITED STATES PATENT OFFICE.

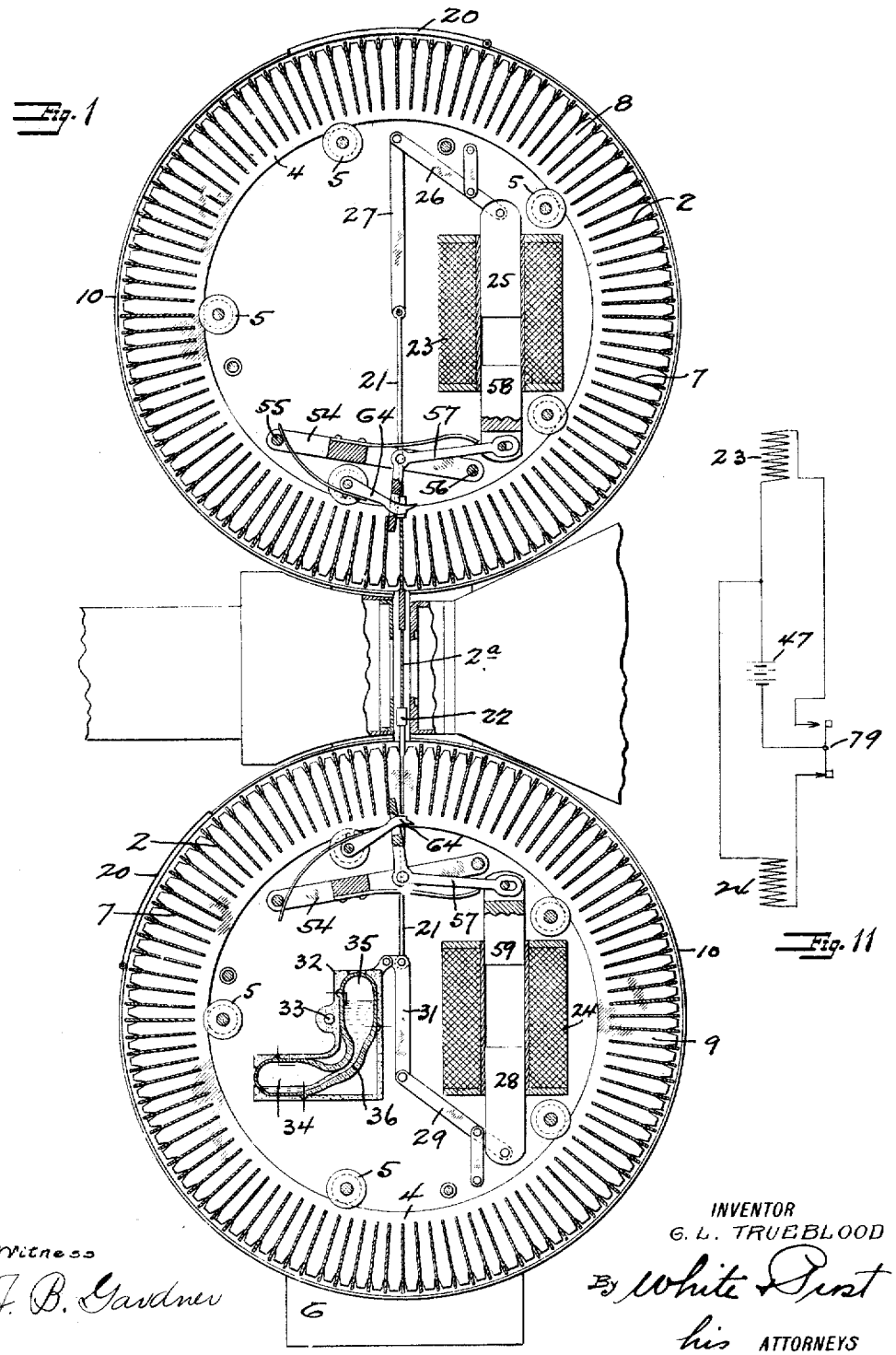

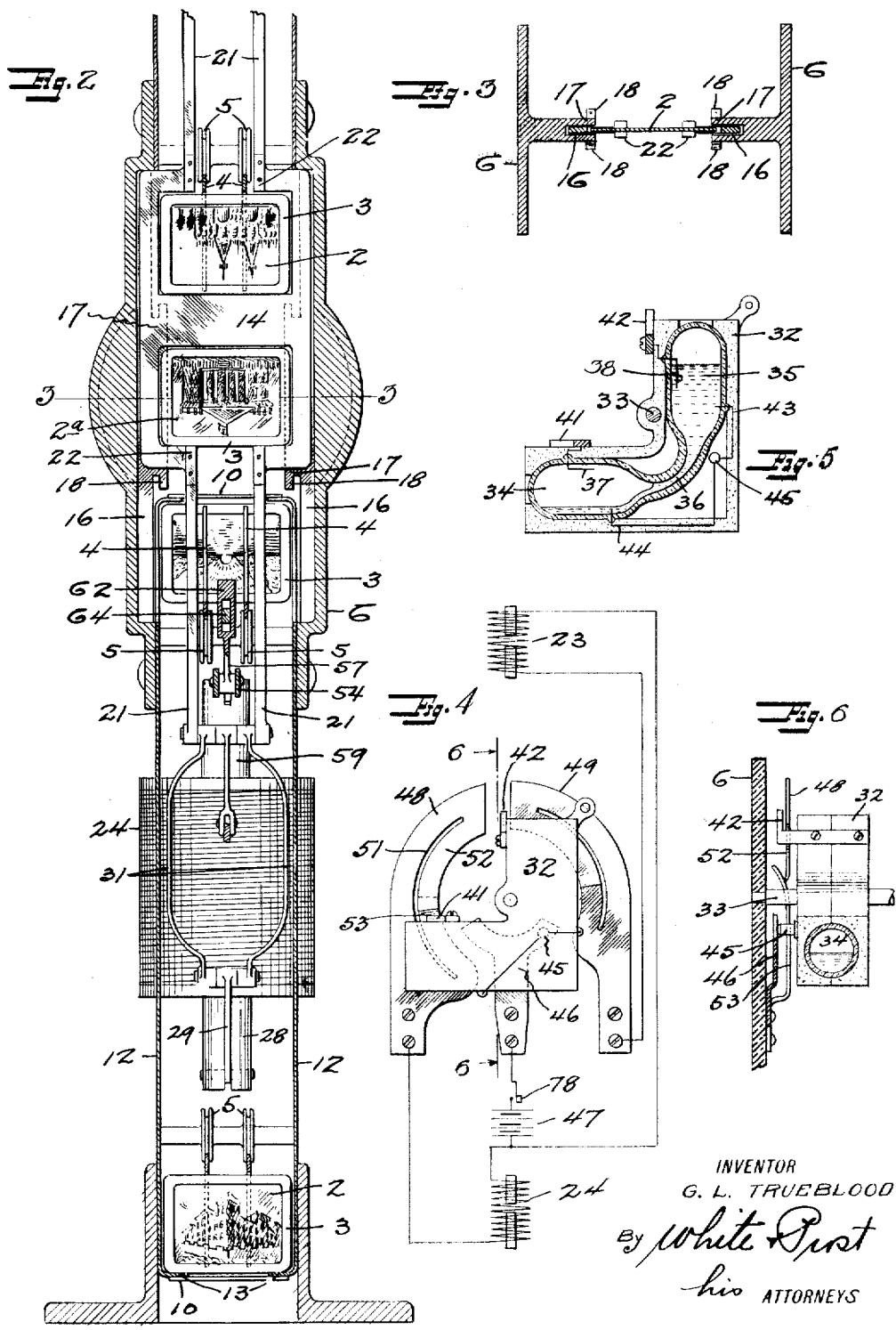

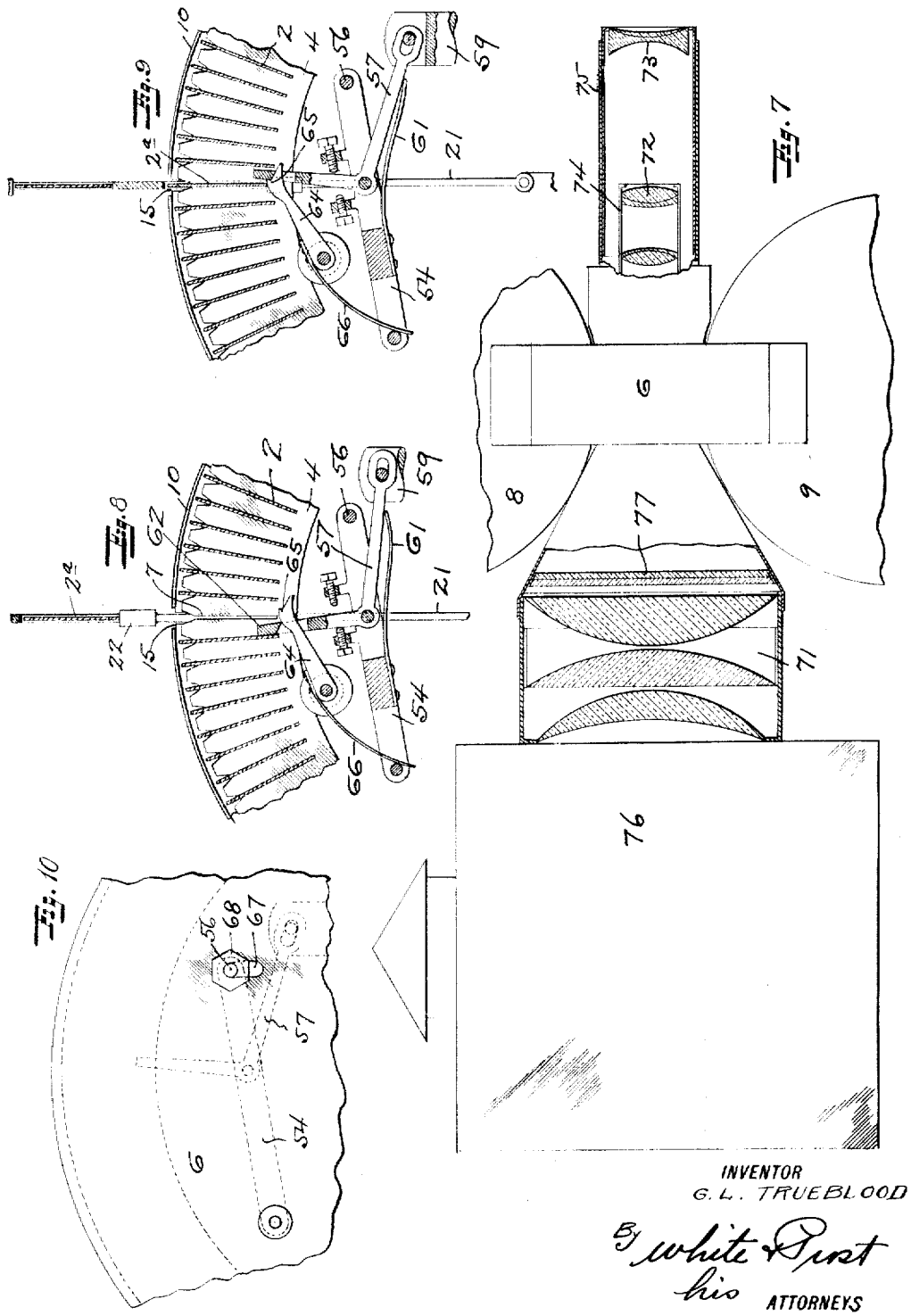

GEORGE L. TRUEBLOOD, OF BERKELEY, CALIFORNIA.

PROJECTING APPARATUS.

1,349,640.   Specification of Letters Patent.   Patented Aug. 17, 1920.

Application filed July 18, 1917. Serial No. 181,255.

*To all whom it may concern:*

Be it known that I, GEORGE L. TRUEBLOOD, a citizen of the United States, and a resident of Berkeley, county of Alameda, and State of California, have invented a certain new and useful Projecting Apparatus, of which the following is a specification.

The invention relates to an apparatus for projecting pictures, advertisements or other matter on a screen or other surface.

An object of the invention is to provide an automatic apparatus for projecting a series of exposures in seriation.

Another object of the invention is to provide means for accurately timing the exposure of the slide.

A further object of the invention is to provide a new form of slide and an optical construction accommodated to such slides.

A further object of the invention is to provide a new form of magazine and means for transferring the slides from the magazine to the field of exposure and for returning them to the magazine.

A further object of the invention is to provide an apparatus of small size arranged to contain and expose a large number of pictures.

The invention possesses other advantageous features, some of which, with the foregoing, will be set forth at length in the following description where I shall outline in full that form of the invention which I have selected for illustration in the drawings accompanying and forming part of the present specification. In said drawings I have shown one specific form of my generic invention, but it is to be understood that I do not limit myself to such form, since the invention as expressed in the claims may be embodied in a plurality of forms.

Referring to said drawings:

Figure 1 is a vertical section through the magazines and the slide moving means of my invention.

Fig. 2 is a vertical section taken at right angles to Fig. 1, the upper part of the upper magazine being broken away to reduce the size of the figure.

Fig. 3 is a horizontal section taken on the line 3—3, Fig. 2.

Fig. 4 is an elevation partly diagrammatic of the means for timing the the exposure of the slide.

Fig. 5 is a vertical section of the contact making device which forms part of the timing mechanism.

Fig. 6 is a section of the timing apparatus taken on the line 6—6, Fig. 4.

Fig. 7 is a side view, partly in section, of the lamp-house, lenses and portions of the magazines.

Fig. 8 is a section of a portion of a magazine showing the means for rotating the magazine in advanced position.

Fig. 9 is a similar view showing the rotating means in retracted position.

Fig. 10 is a side view of a portion of the frame showing the means for moving the rotating means out of operation. Fig. 11 is a diagrammatic representation of a modified form of electric circuit.

The apparatus of my invention is for the purpose of projecting or exhibiting a plurality of slides in succession and the timing of the exposures may be automatic or manual, as desired. For advertising purposes, the timing of the successive exposures is preferably automatic, whereas for illustrated lecture work, the timing may be under the control of the lecturer.

The slides 2, instead of being made of glass, as has been general heretofore, are preferably made of photographic film, of the same size as standard motion picture film, and the section of film is held in a metal frame 3, which is bent over the edges of the film. The metallic frame is preferably made of sheet copper or aluminum and holds the film rigid. The slides 2 are arranged in a circumferential series in two circular magazines, from which they are moved into the light beam. The slides are preferably alternately moved from the two magazines, and the slide moving arrangement is constructed so that as a slide is moved from one magazine into the beam, the slide previously in exposed position is moved into the other magazine.

Each magazine consists preferably of two spaced annular metallic plates 4, mounted on their inner edges on grooved rollers 5, supported in the frame 6. The plates are provided on their outer edges with an equal number of radially disposed, equally spaced slots 7, in which the slides are inserted. One magazine 8 is arranged above the exposure position and the other magazine 9 is arranged below the exposure position.

tion, so that the slides are moved vertically into and out of the exposure position. Surrounding each magazine is a sheet metal case formed of the plates 12 which are provided on their edges with inwardly turned flanges 13, which prevent the slides from becoming dislodged from the magazines as they are rotated. Resting on the flanges and closing the magazine is a band 10, which is cut away at one portion to form a gate 20 through which the slides are fed into the magazine. The flanges are cut away at the gate to permit the insertion of the slides. The slots in the plates 4 are almost equal in depth to the height of the slide, so that the slides seat deeply in the slots, the sheet metal frame contacting with the edges of the slots and holding the slide in place. The outer ends of the slots are preferably tapered to insure the entrance of the slides.

Arranged between the magazines is a reciprocating frame 14 which moves the slides separately from the magazines to the exposure position and vice versa, and the plates 12, band 10 and flanges 13 are cut away or provided with slots 15 into and out of which the reciprocating frame moves. The frame 14 is guided vertically in the slots 16 formed in opposite sides of the frame 6 and the side walls of the slots are provided with inward extensions 17 at the center, or at the exposure position, forming slots into which the slide is moved from the magazine. The extensions 17 are arranged close to the magazines, so that the slide is brought into the slot before it is withdrawn from the magazine and vice versa. The extensions 17 are provided on their ends with outwardly bent ears 18 which form a flaring opening into the slide slot, thereby insuring the proper entry of the slide into the slot.

The reciprocating frame is provided with two slide apertures, spaced apart vertically, so that when one aperture is alined with the beam, the other lies in the path of the slides in the magazine. When the reciprocating frame is depressed, the upper opening lies in the beam and the lower in line with the upper slide in the lower magazine, and when the frame moves upward, it carries the exposed slide into the upper magazine and carries the slide in the lower magazine to the exposure opening. On the subsequent movement of the frame, the slide previously moved up, is moved back into its slots in the lower magazine. Fixed to the reciprocating frame at the top and at the bottom are two bars 21 which lie on the outside of the slotted plates 4, and which are provided on their ends, where they join the frame, with abutments 22, preferably formed of leather or fiber. These abutments lie at the bases of the openings in the frame and engage the edge of the slide, moving it from the magazine to exposure. When the frame is in the raised position, a slide has been extracted from the lower magazine and the bars 21 lie in the vertical plane of the extracted slide, and they lie within the annulus of the upper magazine, so that they do not interfere with the rotation of the upper magazine. The magazine from which the slide is absent is stationary as long as the slide is removed.

The frame 14 is reciprocated vertically by the solenoids 23 and 24 arranged respectively within the annulus of the upper and lower magazines. Movable into the upper portion of the solenoid 23 is a core 25 which is connected by means of the lever 26 and the link 27 with the upper ends of the upper bars 21. Movable into the lower portion of the solenoid 24 is a core 28 which is connected by means of the lever 29 and the split link 31 with the lower ends of the lower bars 21. The link 31 is formed by two members, spaced apart, for reasons which will hereinafter appear.

Means are provided for alternately energizing the solenoids, so that the frame 14 is reciprocated. Pivotally connected to the upper end of the link 31 is a casing 32 which is oscillatable on the shaft 33, bearing in the frame 6. Arranged within the casing is a vacuumized vessel, preferably made of glass, having two chambers 34—35 connected by a narrow passage 36. The chambers are disposed at right angles to each other, one being substantially vertical and the other substantially horizontal and the connecting passage 36 is formed at the bottom of the vertically disposed chamber. The vessel is partly filled with mercury, there being preferably sufficient mercury to almost fill one of the chambers. Extending through the glass, on the upper side of each chamber, when the chamber lies horizontally, are contact wires 37—38, which are respectively connected to contact fingers 41 and 42 arranged on the outside of the casing 32. Those portions of the contact wires 37 and 38 which lie within the chambers are bent, so that they lie parallel to the surface of the mercury in the chamber when the chamber is horizontal, so that the mercury rising in the chamber forms a long contact with the wire. The wires are bent toward the connecting passage 36, so that the contact between the mercury and the wire in the chamber from which the mercury is flowed is maintained until the circuit is broken at some external point. I have found by experiment that the right angle relation of the chambers is desirable for continued perfect operation of the timing mechanism. Flowing mercury has a great tendency to flow in peculiar paths, at times apparently defying gravity and flowing along the upper surface of the chamber, but I have found that by arranging the chambers and the connecting passages as shown, the mercury will flow from one chamber into the bottom of the other and will not flow along the top of the lower chamber and close the circuit prematurely by contacting with the wire 37.

The vessel is oscillated into two positions by the movement of the reciprocating frame, in one position the chamber 35 being elevated above chamber 34 and in the other position the chamber 34 being elevated above chamber 35. The length of time elapsing between the movement of the vessel and the contact of the mercury with the contact wire 37 or 38 in the lower chamber determines the time of exposure of the slide and this is determined by the area of the connecting passage. When it is desired to have the exposures follow each other in very rapid succession, the passage is formed larger and when the time of exposure is to be greater, the passage is made proportionately smaller. The other side of the electric circuit is connected to the contact wires 43—44 which project into the chambers adjacent the passage and which are connected together, so that this side of the circuit is always connected to the mercury. The contact wires 43—44 are connected to the terminal 45 which projects from the casing 32. The circuit through the solenoid to effect proper movement of the reciprocating frame is made by contact of the mercury with the contact wire. The movement of the frame oscillates the mercury vessel and means are provided for opening the circuit when the oscillation is complete, so that the circuit is not opened within the mercury vessel and is only momentarily closed through the solenoid.

Arranged on the frame 6 below the casing 32 and insulated from the frame are a plurality of contact segments which are arranged to be engaged by the terminals 41, 42 and 45 on the casing. The contact segment 46 is continually engaged by the terminal 45 and this segment is connected to one side of the battery 47 or other source of power. The arc shaped segments 48 and 49 are concentric with the shaft 33 and are arranged to be engaged by the terminals 41 and 42 respectively. The segment 48 is connected to the other side of the bottom through the solenoid 24 and the segment 49 is connected to the other side of the battery through the solenoid 23. Terminal 41 is in contact with segment 48 when chamber 34 is receiving mercury and when the circuit is closed by the mercury, the solenoid 24 is energized and the mercury vessel oscillated to move contact 41 out of engagement with the segment 48 and open the circuit. The same is true with relation to contact 42 and segment 49. The segments 48 and 49 are similar in construction and are arranged on opposite sides of the shaft 33. Each segment is formed of an arc shaped piece of resilient metal which is provided with a curved slot 51 and that portion of the segment lying on the inside of the slot is split to form two tongues 52—53. The end of the tongue 53 is drawn out and bent downwardly below the end of tongue 52. The terminal 41 or 42 is provided with a foot which slides on the upper surface of the tongue 52 and when it reaches the free end of the segment the segment springs upwardly, abruptly breaking the contact. On its return movement, the foot on the terminal travels below the tongue 52 until it contacts with the downwardly bent end of tongue 53 and the terminal rides over this downwardly bent end onto the upper surface of the tongue 53, thereby depressing the segment. On its subsequent outward movement the foot again travels over the upper surface of the tongue 52. By means of this construction, an abrupt and accurately timed breaking of the circuit is accomplished and the circuit is not broken until the reciprocating frame has moved the proper distance, to seat the slide in the magazine. It is essential that the frame move this exact distance in order that the slides may be moved into and out of the aperture therein. The casing 32 is so connected to the reciprocating frame, that the terminals are moved out of contact with the segments when the frame reaches the end of its throw. When the frame is in the lower position the casing lies within the split link 31, which is split for that purpose.

Means are provided for rotating the magazines to bring the successive slides therein, into registry with the opening in the reciprocating frame, and these means are so arranged that the magazine is moved only when a slide is not extracted therefrom for exposure, that is, the magazine is not rotated while a slide is removed therefrom for exposure. This is advisable because I desire to insert the exposed slide in the same slot from which it was extracted for exposure. The magazines may be alternately rotated in a step by step motion in many ways and in the present construction I have shown means contacting with a slide in the magazine for moving it.

Pivoted to a bridge 54 arranged within the annulus of the magazine and supported at its opposite ends on pins 55—56 engaging in the frame 6, is a lever 57 which is pivoted at one end to a core which extends into the solenoid associated with the magazine. These cores 58—59 extend into the opposite ends of the solenoids 23—24 from the cores 25—28. The free end of the lever 57 extends to a position between two adjacent slides in the magazine, and is normally pressed forward into advanced position by the spring 61 secured to the bridge 54 and bearing against the lever. When the solenoid 24 is energized, the cores 28 and 59 are drawn into the solenoid, causing a movement of the reciprocating frame 14 and the lever 57. The core 59 being lighter than the core 28 is moved more rapidly, causing the free end 62 of the lever 57 to be moved into its retracted position before the slide 2ª in the frame is moved into its slots in the magazine; that is, the free end of the lever is moved into position behind the slide before the slide is seated in the magazine. As soon as the frame seats the slide in the magazine, the electric circuit through the solenoid 24 is opened and the spring 61 moves the free end 62 of the lever forward, pressing it against the slide which has just been seated and advancing the magazine one step, bringing the successive slide into the aperture in the reciprocating frame. After the desired period of exposure, the solenoid 23 is energized and the movement of the frame repeated and the upper magazine advanced one step. The amount of movement of the lever in opposite directions is limited by the set screws 63 arranged on the bridge 54 on opposite sides of the lever.

Means are provided for preventing a movement of the magazine by the lever, or a movement of the lever forward past the slots into which the extracted slide is to be inserted, prior to the seating of the slide in the slots. Failure of the current supply at a critical time will deënergize the solenoid at an improper time and allow an improper movement of the lever. To prevent this movement, I provide a latch which holds the lever in retracted position until the slide is completely seated in the slots. Pivoted to the frame 6 adjacent the inner edge of the magazine is a latch 64, which extends through an aperture in the free end 62 of the lever 57 and which is provided with a shoulder 65 adapted to engage and hold the lever in retracted position. The latch is pressed upwardly by a weak spring 66, and the end of the latch lies in line with the slot from which the slide is extracted. When the slide is completely seated in the slots it bears against the latch and depresses it out of engagement with the lever, so that the lever is free to move. During the normal operation of the apparatus, the latch will not engage the lever, but should the current fail after the lever has been retracted and before the slide is completely seated in its slots, the latch will hold the lever against forward movement.

Means are also provided for moving the free end of the lever out of the path of the slides in the magazine, so that the magazine may be freely rotated to allow it to be filled with slides or to change the slides therein. The pin 56 upon which one end of the bridge 54 is supported extends through slots 67 in the frame 6 and is held in position by nuts 68. By loosening the nuts, one end of the bridge may be moved sufficiently to move the free end of the lever out of the path of the slides.

The magazines and their supporting frame 6 are arranged between the condensing lens 71 and the projecting lenses 72 and 73. The projecting lens barrels 74 and 75 are mounted on the frame 6 and the condensing lenses are supported on the lamp house 76. In order to protect the film slides from the heat of the lamp, which is concentrated on the film by the condensing lens, I arrange a heat screen 77 between the condensing lens and the film. The heat screen 77 comprises one or more thin sheets of glass containing a small percentage of ferrous oxid and more than 0.2 per cent. of the ferrous oxid. This glass does not materially affect the light rays passing through it, but reduces the infra red radiation from the source of light, so that the film does not become sufficiently heated to cause it to blister or burn.

When it is desired to manually control the exposure of the slides, a push button 78 may be arranged in the circuit between the battery 47 and the contact segment 46, and by closing the circuit with the button, the proper solenoid will be energized to change the slide. When the apparatus is to be used only as a manually controlled device, the automatic timing device may be omitted and the solenoids and battery connected as shown in Fig. 11. The flow of current through the solenoids is controlled by the two-button switch 79, which is operated to close the solenoid circuits alternately.

I claim:

1. In an apparatus of the character described, means for producing a light beam, rotatable slide magazines arranged on opposite sides of said beam and mechanism for simultaneously moving a slide from the beam into one magazine and a slide from the other magazine into the beam.

2. In an apparatus of the character described, means for producing a light beam, rotatable slide magazines arranged on opposite sides of said beam, a reciprocating frame coöperating with said magazines and arranged to move slides from the magazines to the beam and vice versa, and means for recoprocating said frame.

3. In an apparatus of the character described, means for producing a light beam, rotatable slide magazines arranged on opposite sides of said beam, a reciprocating frame arranged between said magazines and arranged to move slides from the magazines to the beam and vice versa, and separate means for moving the frame in opposite directions.

4. In an apparatus of the character described, means for producing a light beam, movable slide magazines arranged on opposite sides of said beam, a reciprocating frame arranged between said magazines and arranged to move slides from the magazines to the beam, a solenoid for moving the frame in one direction and a second solenoid for moving the frame in the opposite direction.

5. In an apparatus of the character described, means for producing a light beam, rotatable slide magazines arranged on opposite sides of said beam, mechanism for simultaneously moving a slide from the beam into one magazine and a slide from the other magazine into the beam, and means for moving the first magazine after the slide has been inserted therein.

6. In an apparatus of the character described, means for producing a light beam, rotatable slide magazines arranged on opposite sides of said beam, mechanism for simultaneously moving a slide from the beam into one magazine and a slide from the other magazine into the beam, and means operative in time with said mechanism for advancing one of said magazines.

7. In an apparatus of the character described, means for producing a light beam, rotatable slide magazines arranged on opposite sides of said beam, mechanism for simultaneously moving a slide from the beam into one magazine and a slide from the other magazine into the beam, and means operative in time with said mechanism for moving the magazine into which the slide is inserted.

8. In an apparatus of the character described, means for producing a light beam, movable slide magazines arranged on opposite sides of said beam, a reciprocating frame coöperating with said magazines and having two apertures therein, one of which is alined with the beam and the other alined with the slides in one of said magazines, and means for moving the magazine containing the slides with which the aperture is alined.

9. In an apparatus of the character described, means for producing a light beam, rotatable slide magazines arranged on opposite sides of said beam, a reciprocating frame coöperating with said magazines and arranged to simultaneously move a slide from one magazine to the beam and another slide from the beam to the magazine, and means for reciprocating said frame.

10. In an apparatus of the character described, means for producing a light beam, rotatable slide magazines arranged on opposite sides of said beam, a reciprocating frame coöperating with said magazines and arranged to simultaneously move a slide from one magazine to the beam and another slide from the beam to the magazine, and separate means for moving the frame in opposite directions.

11. In an apparatus of the character described, means for producing a light beam, rotatable slide magazines arranged on opposite sides of said beam, a reciprocating frame coöperating with said magazine and arranged to simultaneously move a slide from one magazine to the beam and another slide from the beam to the magazine, separate means for moving the frame in opposite directions and means for timing the operation of said means.

12. In an apparatus of the character described, means for producing a light beam, movable slide magazines arranged on opposite sides of said beam, a reciprocating frame coöperating with said magazines and arranged to simultaneously move a slide from the beam into one magazine and another slide from the other magazine into the beam, solenoids for moving said frame in opposite directions, and means for alternately energizing said solenoids.

13. In an apparatus of the character described, means for producing a light beam, movable slide magazines arranged on opposite sides of said beam, a reciprocating frame coöperating with said magazines and arranged to simultaneously move a slide from the beam into one magazine and another slide from the other magazine into the beam, solenoids for moving said frame in opposite directions, means for alternately energizing said solenoids and means operative by the movement of the frame for opening the circuit of the energized solenoid.

14. In an apparatus of the character described, means for producing a light beam, movable slide magazines arranged on opposite sides of said beam, a reciprocating slide-carrying frame associated with said magazines, solenoids for moving said slide in opposite directions, and a timing device for alternately closing the solenoid circuits.

15. In an apparatus of the character described, means for producing a light beam, movable slide magazines arranged on opposite sides of said beam, a reciprocating slide-carrying frame associated with said magazines, solenoids for moving said slide magazines in opposite directions and a timing device connected to said frame and arranged to alternately close the solenoid circuits.

16. In an apparatus of the character described, means for producing a light beam, movable slide magazines arranged on opposite sides of said beam, a reciprocating slide-carrying frame associated with said magazines, solenoids for moving said slide in opposite directions, a timing device connected to said frame and arranged to alternately close the solenoid circuits and means operative by the movement of the timing device for opening the closed circuit.

17. In an apparatus of the character described, means for producing a light beam, movable slide magazines arranged on opposite sides of said beam, a reciprocating slide-carrying frame associated with said magazines, solenoids for moving said slide in opposite directions, and means coöperating with said solenoids for alternately moving the magazines.

18. In an apparatus of the class described, a pair of movable slide magazines, an exposure aperture between said magazines, slides in said magazines, a reciprocating frame arranged to move slides from the magazines to the exposure aperture, and vice versa, and means engaging the slides for moving the magazines.

19. In an apparatus of the class described, a pair of movable slide magazines, an exposure aperture between said magazines, slides in said magazines, a reciprocating frame arranged to move slides from the magazines to the exposure aperture and vice versa, a lever engaging a slide in one magazine and means for moving the lever to advance the magazine.

20. In an apparatus of the class described, a pair of movable slide magazines, an exposure aperture between said magazines, slides in said magazines, a reciprocating frame arranged to move slides from the magazines to the exposure aperture and vice versa, a lever arranged adjacent said frame and adapted to engage the slide inserted in the magazine by the frame and means for retracting the lever to a position behind the slide before the slide is seated in the magazine.

21. In an apparatus of the class described, a pair of movable slide magazines, an exposure aperture between said magazines, slides in said magazines, a reciprocating frame arranged to move slides from the magazines to the exposure aperture and vice versa, a solenoid, a core in said solenoid connected to said frame, a lever for moving the magazine and a core in said solenoid connected to said lever.

22. In an apparatus of the class described, a pair of movable slide magazines, an exposure aperture between said magazines, slides in said magazines, a reciprocating frame arranged to move slides from the magazines to the exposure aperture and vice versa, a pair of solenoids, a core in each solenoid, the cores being connected to the opposite ends of the frame, a circuit for each solenoid, and means for alternately and momentarily closing the solenoid circuits.

23. In an apparatus of the class described, a pair of movable slide magazines, an exposure aperture between said magazines, slides in said magazines, a reciprocating frame arranged to move slides from the magazines to the exposure aperture and vice versa, a pair of solenoids, a core in each solenoid, the cores being connected to the opposite ends of the frame, a circuit for each solenoid, and means connected to said frame for alternately and momentarily closing the solenoid circuits.

24. In an apparatus of the class described, a pair of movable slide magazines, an exposure aperture between said magazines, slides in said magazines, a reciprocating frame arranged to move slides from the magazines to the exposure aperture and vice versa, a pair of solenoids, a core in each solenoid, the cores being connected to the opposite ends of the frame, a circuit for each solenoid, means for alternately closing said circuits, a magazine advancing lever associated with each magazine and a core on each lever associated with said solenoids.

25. In an apparatus of the character described, a magazine comprising two annular plates provided with radially disposed equally spaced slots and rollers upon which said plates are mounted engaging the inner peripheries of said plates.

26. In an apparatus of the character described, a pair of rotatable slide magazines, slides in said magazines, an exposure aperture arranged between said magazines, means for extracting slides alternately from the magazines and moving them before the exposure aperture and means for alternately advancing said magazines in a step-by-step movement.

27. In an apparatus of the character described, a pair of rotatable slide magazines, slides in said magazines, an exposure aperture arranged between said magazines, means for simultaneously moving a slide from exposure position into one magazine, and another slide from the other magazine into exposure position, and means for alternately advancing the magazines in a step-by-step movement.

28. In an apparatus of the character described, a pair of rotatable slide magazines, slides in said magazines, an exposure aperture arranged between said magazines, means for siumltaneously moving a slide from exposure position into one magazine, and another slide from the other magazine into exposure position, and mechanism coöperating with said means and arranged to advance the magazine into which the slide is inserted as soon as said slide is inserted.

29. In an apparatus of the character described, a pair of rotatable slide magazines, slides in said magazines, an exposure aperture arranged between said magazines, means for simultaneously moving a slide from exposure position into one magazine, and another slide from the other magazine into exposure position, and mechanism coöperating with said means and arranged to advance the magazine into which the slide is inserted, and means for preventing the advancing movement of said mechanism until the slide has seated in the magazine 30. In an apparatus of the character described, a pair of rotatable slide magazines, slides in said magazines, an exposure aperture arranged between said magazines, means for simultaneously moving a slide from exposure position into one magazine, and another slide from the other magazine into exposure position, mechanism for advancing each magazine and means for holding the advancing mechanism out of operation.

31. In an apparatus of the character described, a pair of rotatable slide magazines, slides in said magazines, an exposure aperture arranged between said magazines, means for simultaneously moving a slide from exposure position into one magazine, and another slide from the other magazine into exposure position, a lever for advancing each magazine and means for moving the lever out of contact with the magazine, so that the magazine may be freely rotated.

32. In an apparatus of the character described, a pair of rotatable slide magazines, slides in said magazines, an exposure aperture arranged between said magazines, means for simultaneously moving a slide from exposure position into one magazine, and another slide from the other magazine into exposure position, a lever arranged to engage the slides in the magazines for advancing the magazine, and means for moving the lever out of the path of the slides.

33. In an apparatus of the character described, a pair of rotatable slide magazines, slides in said magazines, an exposure aperture arranged between said magazines, means for simultaneously moving a slide from exposure position into one magazine, and another slide from the other magazine into exposure position, a lever for advancing each magazine, and a latch arranged in the path of the inserted slide adapted to engage said lever and hold it in the retracted position.

34. In an apparatus of the character described, a movable magazine, slides in said magazine, an exposure aperture arranged adjacent said magazine, a frame arranged to carry a slide from the magazine to exposure position, a lever for advancing the magazine, a solenoid, a core connected to said slide and associated with said solenoid, and a second core connected to said lever and associated with said solenoid.

35. In an apparatus of the character described, a movable magazine, slides in said magazine, an exposure aperture arranged adjacent said magazine, a frame arranged to carry a slide from the magazine to exposure position, a lever for advancing the magazine, a solenoid, a core connected to said slide and associated with said solenoid, a second core connected to said lever and associated with said solenoid, a circuit for said solenoid, and means for automatically closing said solenoid circuit.

36. In an apparatus of the character described, a movable magazine, slides in said magazine, an exposure aperture arranged adjacent said magazine, a frame arranged to carry a slide from the magazine to exposure position, a lever for advancing the magazine, a solenoid, a core connected to said slide and associated with said solenoid, a second core connected to said lever and associated with said solenoid, a circuit for said solenoid, means for automatically closing said solenoid circuit and means operated by the movement of the frame for opening said circuit.

37. In an apparatus of the character described, a movable magazine, slides in said magazine, an exposure aperture arranged adjacent said magazine, a frame arranged to carry a slide from the magazine to exposure position, a lever for advancing the magazine, a solenoid, a core connected to said slide and associated with said solenoid, a second core connected to said lever and associated with said solenoid, a circuit for said solenoid, a timing device connected to said frame for automatically closing said solenoid circuit and means connected to the timing device for opening said circuit.

38. In an apparatus of the character described, means for producing a light beam, movable slide magazines arranged on opposite sides of said beam and mechanism for moving slides in pairs in opposite directions, one slide of each pair being moved from the beam into a magazine and the other slide of each pair being moved from a magazine into the beam.

39. In an apparatus of the character described, two rotatable magazines separated by an intervening display space, and means for presenting slides from said magazines alternately in said display space.

40. In an apparatus of the character described, two rotatable magazines separated by an intervening display space, means for presenting slides from said magazines alternately in said display space and means for rotating said magazines.

41. In an apparatus of the character described, two movable magazines separated by an intervening display space, means for presenting slides from said magazines alternately in said display space, and means for moving the magazines.

In testimony whereof, I have hereunto set my hand at San Francisco, California, this 25th day of June, 1917.

GEORGE L. TRUEBLOOD.

In presence of—
H. G. PROST.